July 22, 1958
A. H. GIRBOW
2,844,332
SHREDDING MACHINES
Filed Jan. 18, 1955
2 Sheets-Sheet 2
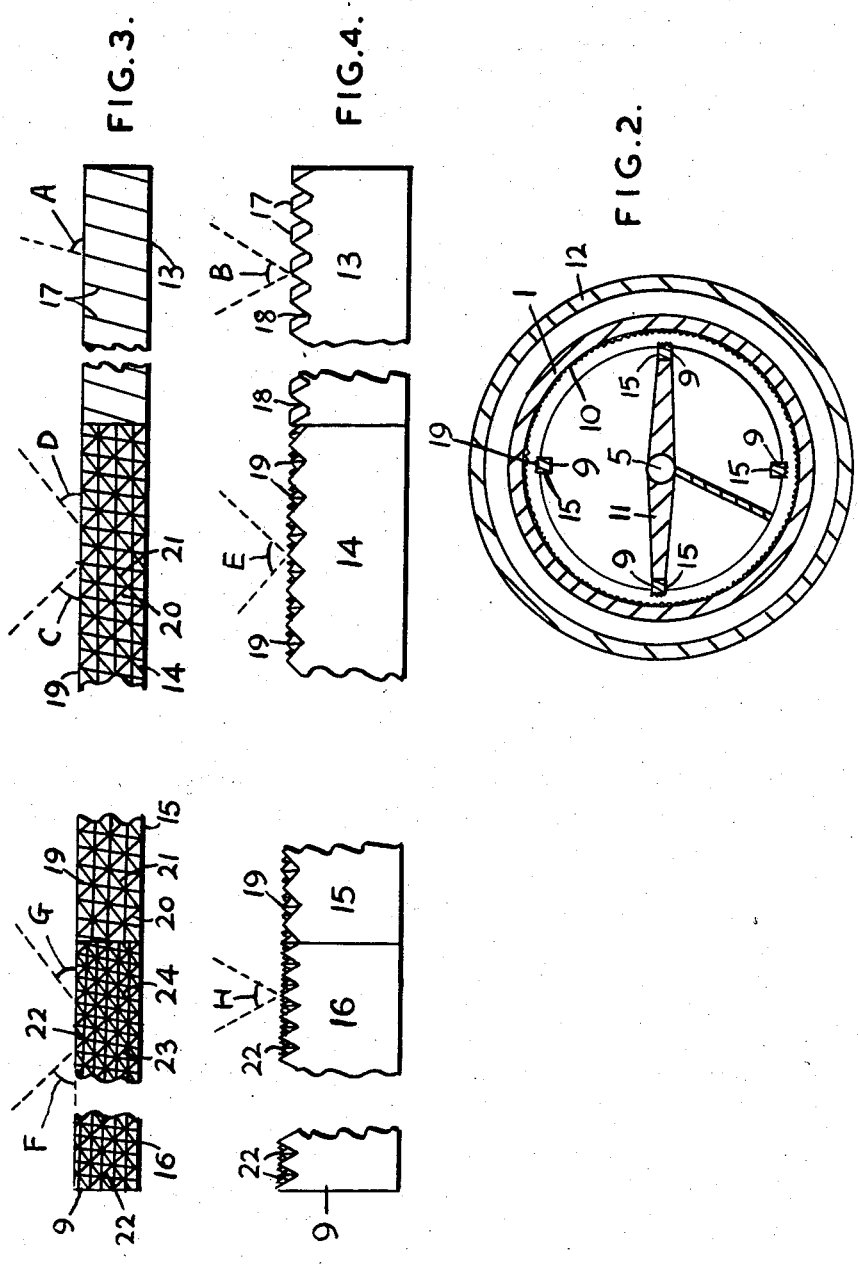

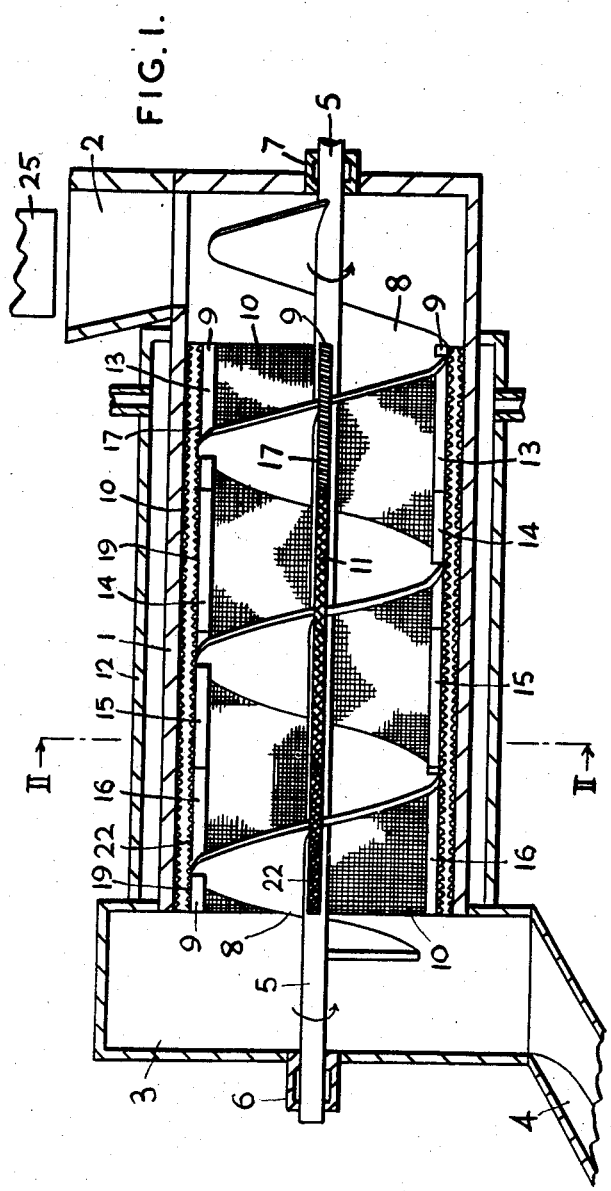

United States Patent Office 2,844,332
Patented July 22, 1958

2,844,332

SHREDDING MACHINES

Arthur Henry Girbow, Bell Green, Coventry, England, assignor to Courtaulds Limited, London, England, a British company Application January 18, 1955, Serial No. 482,617

Claims priority, application Great Britain February 24, 1954

4 Claims. (Cl. 241—276)

This invention relates to shredding machines for alkali cellulose.

In one known method of manufacture of viscose for threads, filaments, fibres and the like, sheets of wood pulp are steeped in dilute caustic soda solution to form alkali cellulose. The sheets are pressed to remove excess liquid and are then shredded to form particles of alkali cellulose known as "crumbs." After ageing for a given period under controlled conditions, the "crumbs" are reacted with carbon disulphide to form cellulose xanthate which is then dissolved in dilute caustic soda solution to form viscose.

In United States Patent 2,717,742 there is described a drum shredder for alkali cellulose in which the teeth mounted on four parallel bars arranged around the periphery of a screw passing through the container are set on the bar at such an angle that they tend to move the alkali cellulose in a direction opposite to that imparted to the alkali cellulose by the screw.

United States of America patent specification No. 2,656,122 describes a screw type comminuting device comprising a cylindrical casing lined internally with four-sided pyramidal teeth and a screw passing through the casing having two parallel toothed members mounted diametrically opposed on the periphery of the screw. The toothed members, at the inlet end of the casing, are provided with straight cutting edges which give way to teeth, gradually diminishing in size towards the outlet end of the casing.

The object of the present invention is to improve the shredding of alkali cellulose in a drum shredder.

According to the present invention, a drum shredder for shredding alkali cellulose comprises a drum having fixed four-sided pyramidal teeth on its inner surface, an inlet at one end and an outlet at the other end, a screw rotatably mounted within the cylinder for forwarding the alkali cellulose from the inlet to the outlet, and at least one toothed bar mounted on the periphery of the screw parallel with the axis of rotation of the screw so that the teeth on the bar pass close to the fixed four-sided pyramidal teeth on rotation of the screw, wherein the teeth on the bar are saw-toothed ridges towards the inlet and pyramidal towards the outlet.

Preferably, about one quarter of the length of the bar from the inlet end is occupied by the saw-toothed ridges which are set at an angle to the bar such that on rotation of the screw they tend to move the alkali cellulose in a direction opposite to that imparted to it by the screw, that is, the trailing edges of the ridges are nearer the inlet than the leading edges. The four-sided pyramidal teeth occupying the remaining length of the bar may be divided into at least two groups, the teeth in the group nearest the outlet being smaller than those in the other groups. The four-sided pyramidal teeth may also be staggered to eliminate gaps transversely across the bar.

A specific example of a drum shredder constructed in accordance with this invention is shown in the accompanying drawings, in which—

Figure 1 is a front elevation of the shredder in section,
Figure 2 is a section through line II—II of Figure 1,
Figure 3 is a plan view on an enlarged scale of a toothed bar shown in Figure 1, and
Figure 4 is a front elevation of Figure 3.

The drum shredder shown in Figures 1 and 2 is similar in construction to that described in Patent 2,717,742 referred to above. It comprises a drum 1 having an inlet 2 at one end and a collecting chamber 3 at the other end leading to an outlet 4. A shaft 5 rotatably mounted in bearings 6, 7 passes through the central axis of the drum and is rotated, for example at 170 revolutions per minute, in the direction shown by the arrows by a drive (not shown). Mounted on the shaft 5 is a screw 8 which carries four toothed bars 9 at equally spaced points around its periphery and the internal wall of the drum 1 has fixed four-sided pyramidal teeth 10 over the area swept by the bars 9. A baffle 11, shown more particularly in Figure 2, mounted within and rotated by the screw 8, extends diametrically across the screw 8 between two of the bars 9. The temperature of the drum 1 may be adjusted by passing a heating or cooling fluid through a jacket 12 surrounding the drum 1.

Each bar 9 is made up of four strips 13, 14, 15, 16 of substantially equal length. Strip 13 has on its outwardly pointing surface a number of saw-toothed ridges 17 formed by cutting a number of grooves 18 (Figure 4) in the strip 13 at an angle A (Figure 3) of 75° to the longitudinal axis of the bar 9. The apex angle B of each of the ridges 17 is 60°.

The strips 14, 15 have a group of four-sided pyramidal teeth 19 formed by cutting two series of grooves 20, 21 (Figure 3). The grooves 20 are cut at an angle C of 48°, and the grooves 21 at an angle D of 38°, both to the longitudinal axis of the bar 9. The apex angle E (Figure 4) of each of the four-sided pyramidal teeth 19 is 90° C.

Strip 16 also has a group of four-sided pyramidal teeth 22, smaller than the teeth 19 formed by cutting two series of grooves 23, 24 (Figure 3) in which the grooves 23 are cut at an angle F of 48° and the grooves 24 at an angle G of 38°, both to the longitudinal axis of the bar 9. The apex angle H (Figure 4) of each of the four-sided pyramidal teeth 22 is 60°.

As the angles C and D and F and G are unequal, the respective four-sided pyramidal teeth 19, 22 are staggered to eliminate gaps transversely across the bar 9.

In operation, sheets of alkali cellulose are fed to a pre-breaker, part of which is shown at 25 in Figure 1, and the broken pieces fall into the inlet 2 of the drum 1. The alkali cellulose is then forwarded into the body of the drum 1 by the screw 8 where it is thrown by centrifugal force against the fixed four-sided pyramidal teeth 10 lining the drum. At this point, the alkali cellulose is subjected to a chopping action between the teeth 10 and the ridges 17 carried by the strips 13 when it is cut into relatively coarse pieces. The ridges 17, being set on the strip 13 at the angle A, tend to move the alkali cellulose towards the inlet 2 in opposition to the more positive forwarding action of the screw 8.

Between the teeth 19 and the teeth 10, the coarse alkali cellulose pieces are further reduced in size by a tearing action which has the effect of opening the fibres in the resulting particles. Finally, between the teeth 22 and the teeth 10, a similar but less severe tearing action taken place reducing the alkali cellulose to particles which are of optimum size and in which the fibres have been substantially opened to facilitate subsequent ageing and xanthation in the manufacture of viscose.

The alkali cellulose particles are thrown from the end of the screw 8 into the collecting chamber 3 from which they are removed through the outlet 4. The baffle 11 ensures that the alkali cellulose passes between the teeth 10 and the ridges 17 and the teeth 19, 22 and not under the bars 9.

The bars 9 can be used in any form of drum shredder in which there is a screw rotating within a drum having an inner lining of fixed teeth.

What I claim is:

1. A drum shredder for shredding alkali cellulose comprising a horizontal drum, fixed four-sided pyramidal teeth lining the inner surface of the drum, an inlet at one end of the drum, an outlet at the other end of the drum, a screw mounted for rotation within the drum for conveying alkali cellulose from the inlet to the outlet, at least one toothed bar mounted on the periphery of the screw adjacent the fixed four-sided pyramidal teeth and parallel with the axis of rotation of the screw, the toothed bar being provided with saw-toothed ridges adjacent the inlet for chopping the alkali cellulose conveyed by the screw into coarse pieces against the fixed pyramidal teeth and adjacent the outlet with pyramidal teeth for tearing and opening the coarse pieces of alkali cellulose against the fixed pyramidal teeth.

2. A drum shredder as claimed in claim 1 in which the four-sided pyramidal teeth occupy about three quarters of the length of the toothed bar.

3. A drum shredder as claimed in claim 2 in which the number of pyramidal teeth per unit area adjacent the saw-toothed ridges is less than the number of pyramidal teeth per unit area adjacent the outlet.

4. A drum shredder as claimed in claim 3, in which the four-sided pyramidal teeth are divided into at least two groups, but not more than five groups, the number of four-sided pyramidal teeth per unit area in the group adjacent the saw-toothed ridges being less than the number of pyramidal teeth per unit area in the group adjacent the outlet.

References Cited in the file of this patent

UNITED STATES PATENTS

| | | |
|---|---|---|
| 58,772 | Chapman | Oct. 16, 1866 |
| 668,252 | Beall | Feb. 19, 1901 |
| 2,656,122 | Borner | Oct. 20, 1953 |
| 2,717,742 | Weighman | Sept. 13, 1953 |